US008307040B2

(12) United States Patent
Malik et al.

(10) Patent No.: US 8,307,040 B2
(45) Date of Patent: Nov. 6, 2012

(54) REDUCING ERRORS IN SENDING FILE ATTACHMENTS

(75) Inventors: Nadeem Malik, Austin, TX (US); Katherine J. Pearsall, Georgetown, TX (US); Steven L. Roberts, Cedar Park, TX (US); Mithkal M. Smadi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 12/502,271

(22) Filed: Jul. 14, 2009

(65) Prior Publication Data

US 2011/0016181 A1 Jan. 20, 2011

(51) Int. Cl.
*G06F 15/16* (2006.01)
(52) U.S. Cl. ........................................... 709/206
(58) Field of Classification Search .................... 709/206
See application file for complete search history.

(56) References Cited

U.S. PATENT DOCUMENTS

| 6,385,767 | B1 | 5/2002 | Ziebell |
| 6,424,983 | B1* | 7/2002 | Schabes et al. ............... 715/257 |
| 6,751,603 | B1* | 6/2004 | Bauer et al. ........................... 1/1 |
| 7,086,003 | B2 | 8/2006 | Demsky et al. |
| 2004/0255247 | A1* | 12/2004 | Demsky et al. ............... 715/530 |

OTHER PUBLICATIONS

Raska, "Sorting Files with Version Numbers", Nov. 8, 2007, p. 1.*

* cited by examiner

*Primary Examiner* — Ryan Jakovac
(74) *Attorney, Agent, or Firm* — Matthew B. Talpis; Gregory K. Gorshorn; Greg Goshorn, P.C.

(57) ABSTRACT

The claimed subject matter comprises a technology to scan a document for file attachments, generate alternative file names corresponding to a particular attachment, determine whether or not the particular file attachment is the latest version of a file or has a name and/or file path that could be confused with the name and/or path of another file. In the event one of the above conditions are met, the technology provides the means for a user to verify that the file attachment is the desired file and, if necessary, to select an alternative file for attachment.

23 Claims, 5 Drawing Sheets

REDUCING ERRORS IN SENDING FILE ATTACHMENTS

BACKGROUND

The claimed subject matter relates generally to electronic mail, or email, and, more specifically, to a method to ensure that an email attachment is the correct file.

SUMMARY

The claimed subject matter comprises a technology to scan a document for file attachments, generate alternative file names corresponding to a particular attachment, determine whether or not the particular file attachment is the latest version of a file or has a name and/or file path that could be confused with the name and/or path of another file. In the event one of the above conditions are met, the technology provides the means for a user to verify that the file attachment is the desired file and, if necessary, to select an alternative file for attachment.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
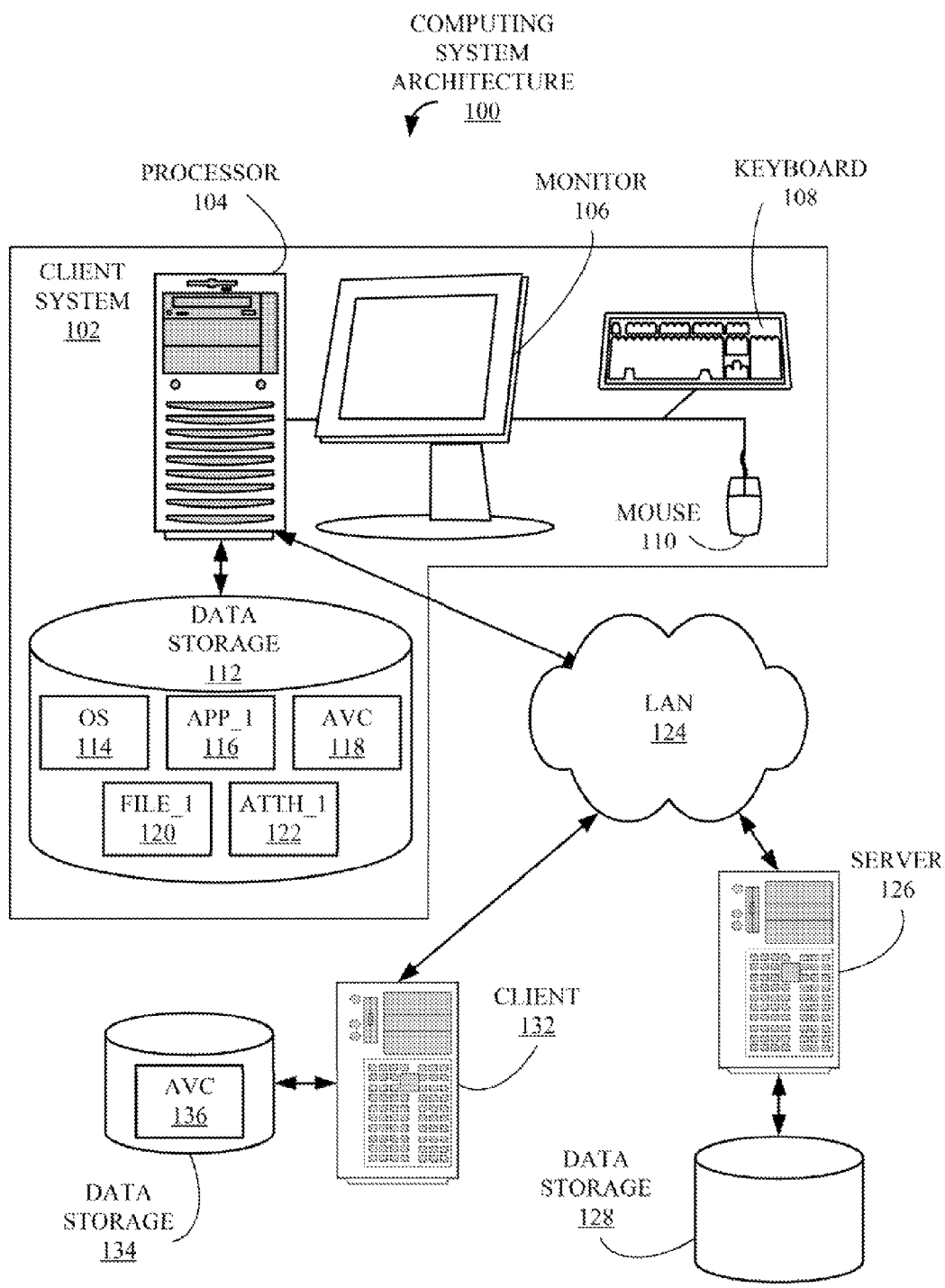
FIG. 1 is one example of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for validating file attachments. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Over the past several decades, computer users have become increasingly connected by networks, including the Internet. This connectivity has enabled users to communicate via electronic mail, or "email." As email has become more ubiquitous, the utility has also expanded. Today, most people use email for a variety of personal and business reason.

One common utility associated with email is the attachment of files. In addition to a typical text message, people transmit as attachments photographs, documents, spreadsheets and so on as file attachments. If a user who is in the process of editing a document, transmits the document as an email attachment before the latest changes have been saved to memory, currently available email programs will attach a copy of the document that is out of date, i.e. the attached document does not include any changes made after the last save. This is because many programs such as, but not limited to, word processors, photo editors and spreadsheets create a temporary file when a particular file is opened. These programs save changes to the temporary file and only update the original file when the user explicitly saves the file.

In another scenario, an email program displays a file listing so that a user can select a particular file to attach to an email. If there are multiple files with similar names such as a file with multiple versions or multiple files with the same name that are stored in different directories, a user may inadvertently select the wrong version or the wrong file for attachment.

Provided is a method for validating file attachments to ensure that the attached files are not, among other things, stale or outdated. The Specification uses a word processing program as an example but it should be understood that the disclosed techniques are applicable to, but not limited to, word processing, spreadsheet and any other document application that relies upon making, or relies upon another application that makes, a temporary copy of a document. The disclosed techniques are also applicable to any operating systems, or "platform," including but not limited to, WINDOWS®, published by the Microsoft Corporation of Redmond, Wash., and versions of Linus/Unix.

Turning now to the figures, FIG. 1 is a block diagram of one example of a computing system architecture 100 that may incorporate the claimed subject matter. A client system 102 includes a processor 104, coupled to a monitor 106, a keyboard 108 and a mouse 110, which together facilitate human interaction with computing system 100 and client system 102. Also included in client system 102 and attached to processor 104 is a data storage component 112, which may either be incorporated into processor 104, i.e. an internal device, or attached externally to processor 104 by means of various, commonly available connection devices such as but not limited to, a universal serial bus (USB) port (not shown).

Data storage 112 is illustrated storing an operating system (OS) 114 that controls the operation of computing system 102, an example of an application that employs file attachments, or App_1 116, a Attachment Verification Component (AVC) 118 that implements the claimed subject matter, a file used as an example throughout the Description, or File_1 120, and a file used throughout the Description as an example of attachment, or Atth_1 122. In this example, AVC 118 is configured to work in conjunction with OS 114 to implement the claimed subject matter and is described in more detail below in conjunction with FIGS. 3-5. In the alternative AVC 118 could be incorporated into App_1 116, either as an integral component or as a plug-in module. Those with skill in the computing arts should appreciate that there are multiple OSs, or "platforms," to which the claimed subject matter applies.

Client system 102 and processor 104 are connected a local area network (LAN) 124, which is also connected to a server computer 126. Although in this example, processor 104 and server 126 are communicatively coupled via LAN 124, they could also be coupled through any number of communication mediums such as, but not limited to, the Internet (not shown). Further, it should be noted there are many possible computing system configurations, of which computing system 100 is only one simple example.

Server computer 126 is coupled to a data storage 128, which like data storage 114, which may either be incorporated into server 126, i.e. an internal device, or attached externally to server 126 by means of various, commonly available connection devices such as but not limited to, a USB port (not shown).

Also communicatively coupled to the LAN 124 is a second client computer 132, which like client computer 102, includes a data storage 134. Data storage 134 also includes an AVC component 136, which may handle file attachment issues with respect to various applications (not shown) on client 132 in a fashion similar to AVC 118 on client computer 102. Although not shown in FIG. 1, it should be understood that each of server 126 and client 132 include a processor, monitor, keyboard and mouse like components 104, 106, 108 and 110, respectively.

Figure 2:
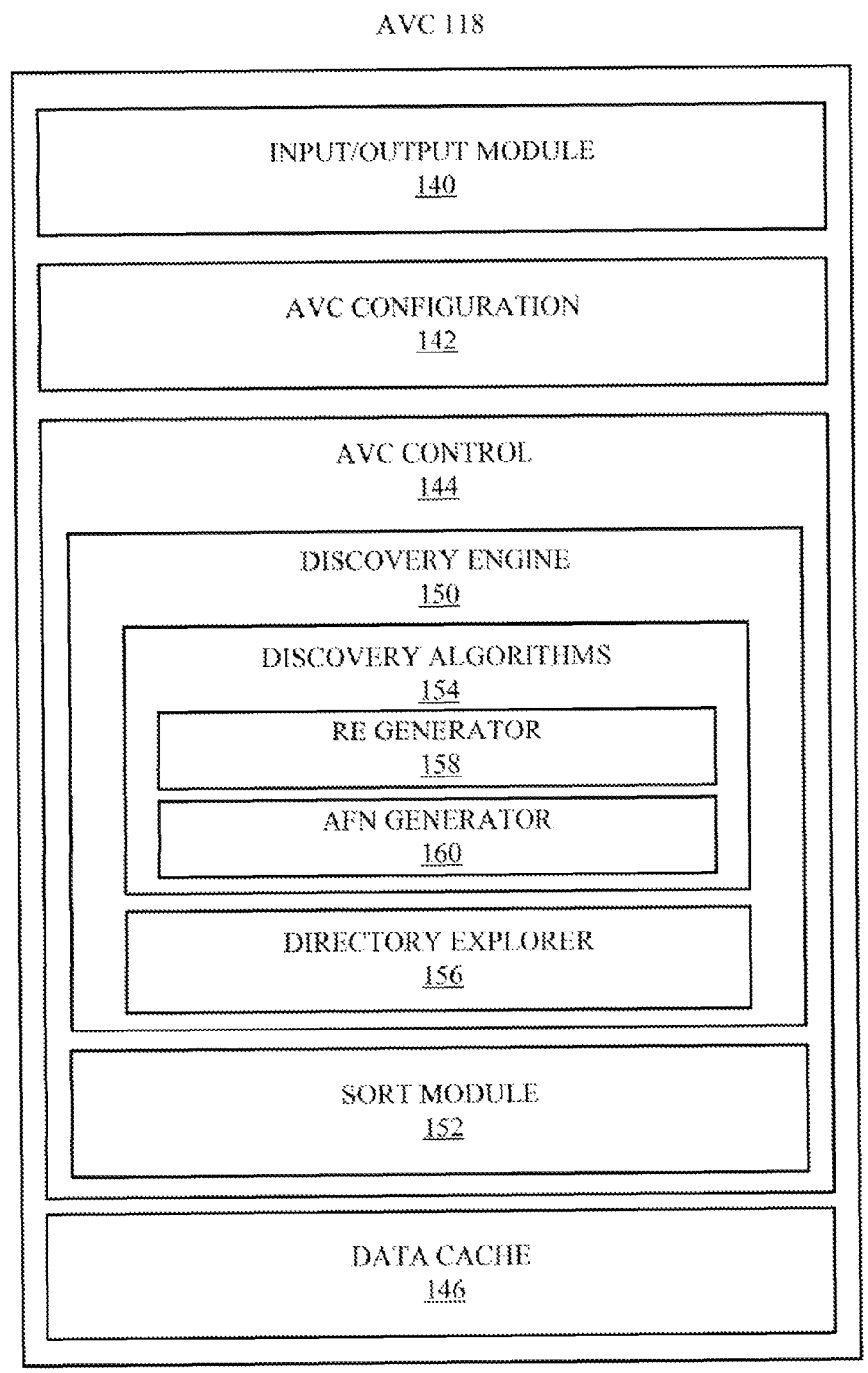
FIG. 2 is a block diagram of an Attachment Validation Component (AVC), first introduced in FIG. 1, in more detail.

FIG. 2 is a block diagram of AVC 118, first introduced in FIG. 1, in more detail. In this example, AVC 118 is stored on data storage 112 (FIG. 1) and executed on processor 104 (FIG. 1) of client system 102 (FIG. 1). Of course, AVC 118 could also be stored and executed on another computing system such as server 122 that executes services for client system 102. For example, electronic mail servers are often located on remote computing systems. AVC 118 includes an input/output (I/O) module 140, an AVC Configuration module 142, an AVC Control module 144 and a data cache component 146. It should be understood that the representation of AVC 118 in FIG. 2 is a logical model. In other words, components 140, 142, 144, 146 and other components described below may be stored in the same or separate files and loaded and/or executed within system 100 either as a single system or as separate processes interacting via any available inter process communication (IPC) techniques.

I/O module 140 handles communication AVC 118 has with other components of computing system 102 and system 100. AVC configuration module 142 stores parameters defined by an administrator to control the setup and operation of AVC 118. Examples of such configuration parameters include, but are not limited to, security settings, display options and so on. In addition, parameters may be defined that list potential users, applications and computing hosts and corresponding degrees of file matching and specific implementations of the claimed technology.

AVC Control module 144 stored the logic that controls the operation of AVC 118. Examples of logic modules that may be included in module 144 include a Discovery Engine 150 and a Sort module 152. Control logic 144 extracts filenames and directories corresponding to an attachment and feed this information into discovery engine 150. Discovery engine 150 scans file directories of data storage 112 to locate possible alternative files for any particular attached file. Particular portions of data storage 112 that are searched as well as the degree of correspondence between an attached file and a potential alternative are controlled by parameters stored in AVC configuration 142.

Discovery engine 150 includes a Discovery Algorithms module 154 and a Directory Explorer module 156, both of which execute logic associated with Discovery engine 150. Discovery algorithms module 154 includes a Regular Expression (RE) generator 158, which generates regular expressions corresponding to a file under examination, and a Associate Filename (AFN) Generator 160, which employs the regular expressions generated by module 158 to create a list of possible alternative file names.

AVC control 144 also includes Sort module 152 that organizes the information collected by Discovery Engine 150. The operation of Discovery Engine 150, Discovery Algorithms module 154, RE generator 158, AFN generator 160, Directory Explorer 156 and Sort module 152 are explained in more detail below in conjunction with FIGS. 3-5.

Data Cache 146 is a data repository for information, including settings and lists that AVC 118 requires during operation. Examples of the types of information stored in cache 146 include, but are not limited to, specific files and directories employed in conjunction with AVC control 144, corresponding patterns associated with the processing of modules 154 and 156. In addition, cache 146 may store intermediate results associated with the processing of AVC 118.

Figure 3:
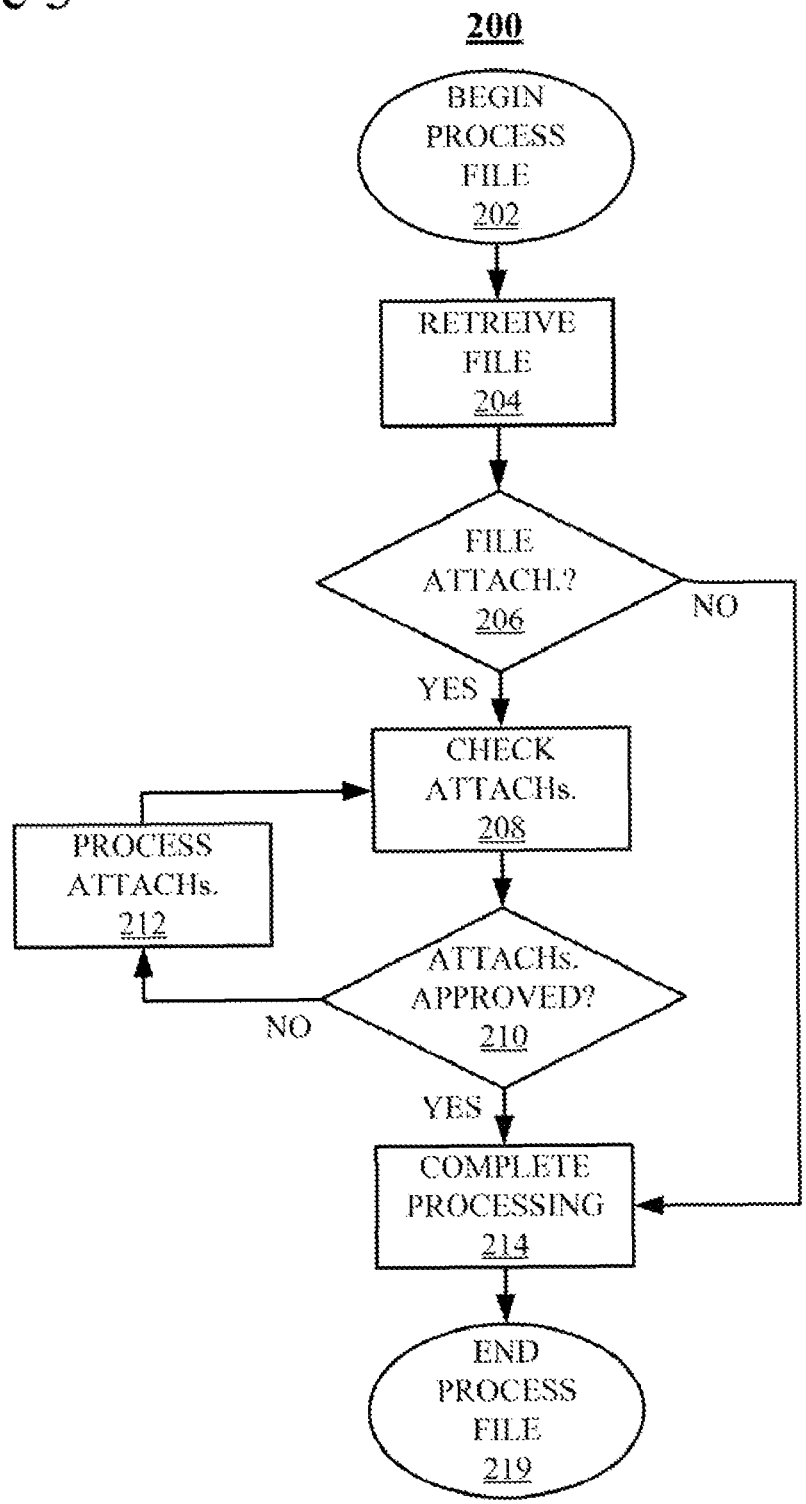
FIG. 3 is a flow chart illustrating a Process File process that incorporates an example of processing that may implement an aspect of the claimed subject matter.

FIG. 3 is a flow chart illustrating an Process File process 200 that is one example of an application the incorporates the claimed subject matter. In this example, logic associated with process 200 is stored on data storage 112 (FIG. 1) as part of AVC 118 (FIG. 1) and executed on processor 104. In the alternative, process 200 may be incorporated into App_1 116 (FIG. 1).

Process 200 starts in a "Begin Process File" block 202 and proceeds immediately to a "Retrieve File" block 204. During block 204, a file, in this example file_1 120 (FIG. 1), associated with App_1 116 is transmitted to AVC 118 as part of an example of an implementation of the claimed subject matter. Typically, file_1 120 is transmitted to AVC 118 once has user has indicated that processing of file_120 is complete. For example once an email has been prepared and a "Send" button has been clicked. In the alternative, app_1 116 may provide the option of checking a file at any time.

During a "File Attachment?" block 206, process 200 determines whether or not file_1 120 includes one or more attachments such as attch_1 122. If so, process 200 proceeds to a "Check Attachments" block 208, which is described in detail below in conjunction with FIG. 4. During an "Attachments Approved" block 210, process 200 determines whether or not the attachments detected during block 206 and checked during block 208 have been approved for transmission. It should be noted that parameters may be set to establish automatic approval procedures, e.g. the attached file is the most current, or require that all attachments be subjected to user scrutiny.

If all attachments have not been approved, either automatically or explicitly by a user depending upon setup parameters, process 200 proceeds to a "Process Attachment" block 212 during which the user who attached the file is given the opportunity to either select another file form a list provided by AVC 118 or cancel the attachment and start over with a selection. Processing associated with block 212 is described in more detail below in conjunction with FIG. 5. Control then returns to Check Attachments block 208 and processing continues as described above.

If process 200 determines during block 206 that file_1 120 does not include an attachment or if, during block 210, the user has indicated that attached files are the intended attachments, control proceeds to a "Complete Processing" block 214. During block 214, the original intention of app_1 116 is executed. For example, if app_1 116 is an email program, the file and the attachment, if there is one, is transmitted, or sent, to the intended recipient(s). Finally, during an "End Process File" block 219, process 200 is complete.

Figure 4:
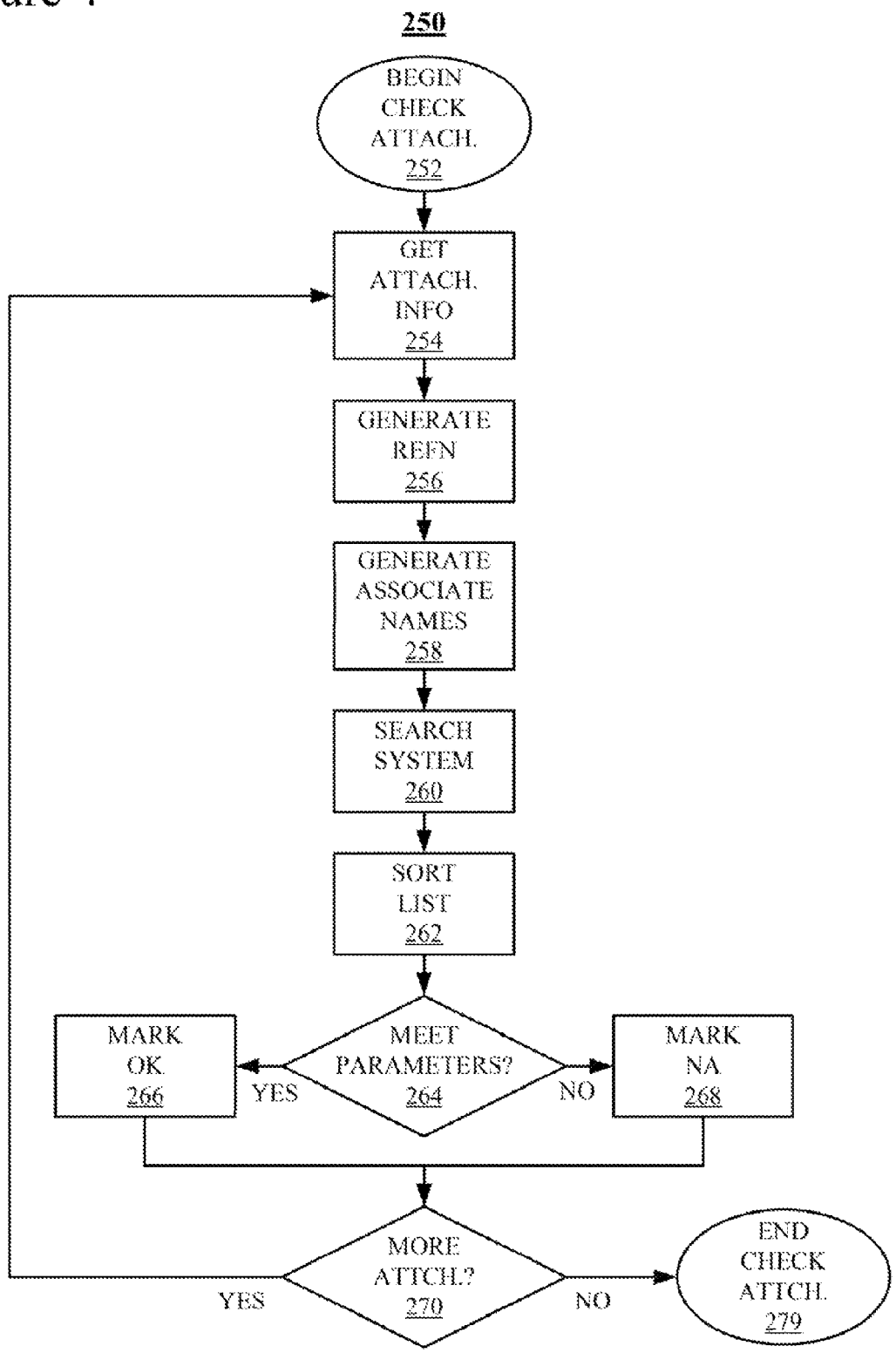
FIG. 4 is a flow chart illustrating a Check Attachment process that is one example of processing that may implement an aspect of the claimed subject matter.

FIG. 4 is a flow chart illustrating a Check Attachment process 250 that is one example of processing that may implement the claimed subject matter (see 208, FIG. 3). In this example, logic associated with process 250 is stored on data storage 112 (FIG. 1) as part of AVC 118 (FIGS. 1 and 2) and executed on processor 104. In the alternative, process 200, as well as AVC 118, may either be incorporated into either OS 114 (FIG. 1) or an application such as App_1 116 (FIG. 1).

Process 250 starts in a "Begin Check Attachment (Attch.)" block 252 and proceeds immediately to a "Get Attch. Info" block 254. During block 254, process 250 gathers information about file that is being processed, in this example Attch_1 122 (see element 150, FIG. 2 and process 200, FIG. 3). Information typically includes, but is not limited to, the name of the file, dates and times associated with the file, the directory from which the file originated and a version number if the file is part of a series of related files.

During a "Generate Regular Expression File Names (REFN)" block 256, process 250, based upon the name of the file of attch_1 122 and information from AVC configuration 142 (FIG. 2), generates regular expressions corresponding to the name of attch_1 122 (see element 158, FIG. 2). For example, if attch_1 122 has a name of "FileName v1.txt" a regular expression may be "FileName*.txt," which would match and files such as "FileName v2.txt" and "FileName v3.txt." Regular expressions may be based upon the name of a file and/or on conventions associated with OS 114 such as, but not limited to, particular directory naming or file extension conventions. For example, some platforms store temporary files in a specific directory, e.g. a "/tmp" directory while other platforms store temporary in a current directory and either add a '~' character at the beginning of a file name or modify the file extension.

During a "Generate Associated Names" block 258, process 250 generates the names of possible alternative file name that may be associated with attch_1 122 (see element 160, FIG. 2). For example, if a user is working with revisions of documents, alternative files include the different revision numbers. Files names may be collected based upon the date and time the files were created and modified. The names of files that have similar spellings may also be generated employing algorithms typically associated with spell-checking logic. In addition, names are generated that may be associated with any temporary versions of a file. For example, if a file entitled "file.txt" is currently opened by a word processing application (WPA), the WPA may be storing unsaved changes to a file entitled "~file.txt." Those with skill in the computing arts should appreciate the many variations that could be employed to generate associated file names. Control of how thorough the generation of alternative files is to be depends upon configuration parameters set by a system administrator or user (see element 142, FIG. 2).

During a "Search System" block 260, process 250 scans memory associated with client system 102, which may include such memory as data storage 112 and remote storage such as data storage 128 (FIG. 1) to locate actual files that match the file names generated during block 258 (see element 150, FIG. 2). During a "Sort List" block 262, process 250 sorts the list of actual file names collected during block 260 to produce a sorted list of file names (see element 152, FIG. 2). Depending upon configuration parameters, the list may be sorted by version number, date/time of creation or modification or any of a number of possible scenarios. Files may be sorted based upon the closeness of a name or directory match. In this manner, more likely alternative files may be listed first and less likely files listed later. A displayed listing may also include a degree of correlation between a particular selected files and possible alternatives.

During a "Meet Parameters?" block 264, process 250 determines whether or not the original file, which in this example is attch_1 122, meets the configuration parameters established for automatic acceptance. As noted above, the parameters may also be set so that any attachment must be verified by a user, i.e. there is not automatic approval. If so, attch_1 122 is marked as "Approved" during a "Mark Not Approved (NA)" block 266 and, if not, attch_122 is marked as not approved during a "Make Not Approved" block 268. Control then proceeds to a "More Attach.?" block 266 during which process 250 determines whether or not there are more attachments associated with file_1 120. If so, control returns to block 254 and processing continues as described above with respect to the next attachment. If not, control proceeds to an "End Check Attach." block 269 in which process 250 is complete.

Figure 5:
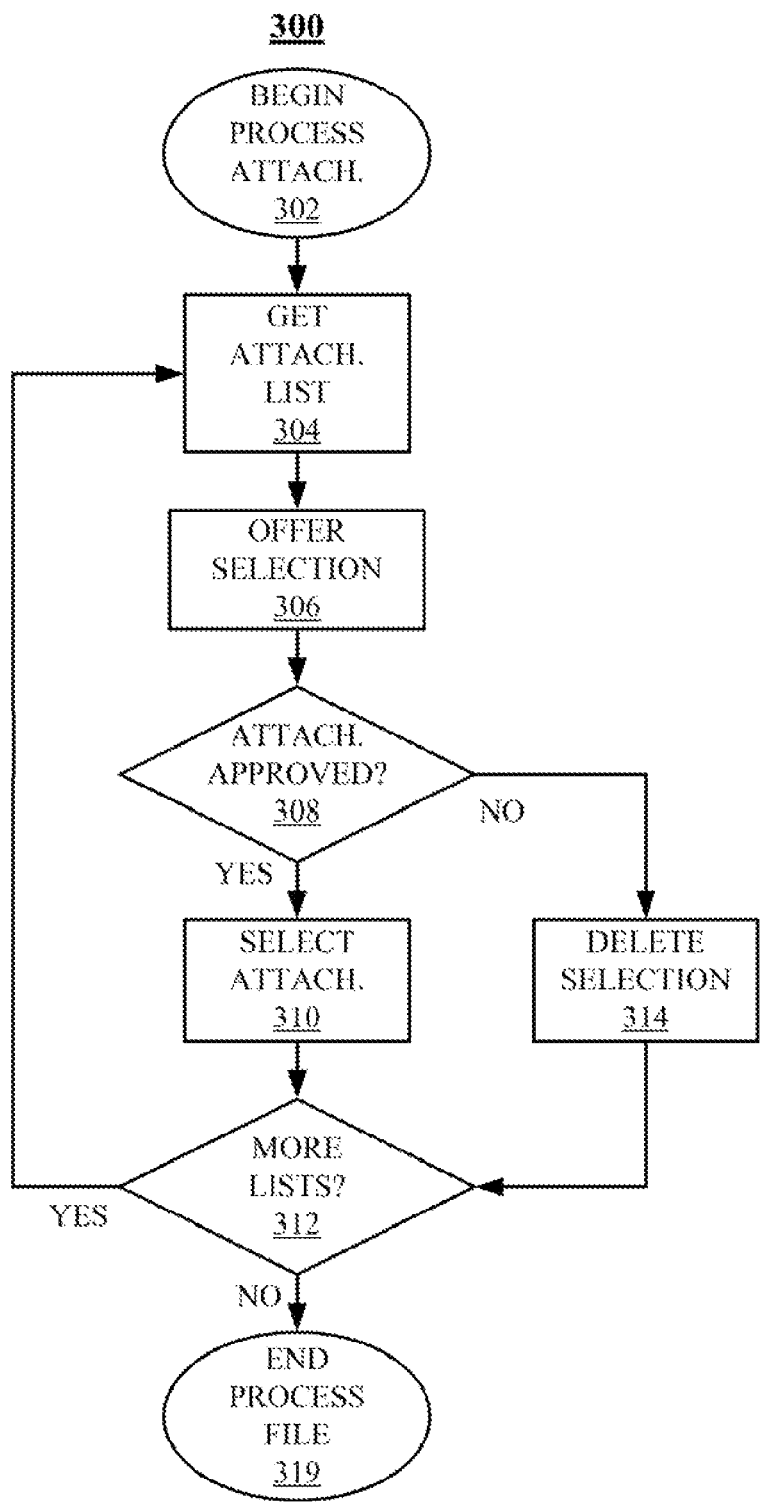
FIG. 5 is a flow chart illustrating a Process Attachment process that is one example of processing that may implement an aspect of the claimed subject matter.

FIG. 5 is a flow chart illustrating a Process Attachment process 300 that is one example of processing that may implement the claimed subject matter (see element 212, FIG. 3). In this example, logic associated with process 300 is stored on data storage 112 (FIG. 1) as part of AVC 118 (FIGS. 1 and 2) and executed on processor 104. In the alternative, process 300, as well as AVC 118, may either be incorporated into either OS 114 (FIG. 1) or an application such as App_1 116 (FIG. 1).

Process 300 starts in a "Begin Process Attachment (Attch.)" block 302 and proceeds immediately to a "Get Attch.List" block 304. During block 304, process 300 receives a list associated with an attachment such as attch_1 122 (FIG. 1) that has been checked and possibly marked for closer review in conjunction with a list of alternative file names that have been generated (see process 250, FIG. 4). During an "Offer Selection" block 306, process 300 generates a graphical user interface (GUI) for display on monitor 106 so that the user can see the alternative files and make a selection.

During a "Attch. Approved?" block 308, process 300 determines whether or not the user has selected a file in the list displayed during block 306 or has indicated that more attachments need to be scrutinized for selection. If the user has approved an attachment, control proceeds to a "Select Attch." block 310 during which the selected file is added to file_1 120 as an attachment for transmission.

If no attachment is a list of attachments has been approved during block 308, process 300 proceeds to a "Delete Selection" block 314 during which attch_1 122 is deselected for attachment. Once processing has completed in blocks 310 or 316, control proceeds to a "More Lists?" block 312 during which process 300 determines whether or no there are more lists of attachments to process. If so, control returns to block 304 and processing continues as described above on the next list. If not, control proceeds to an "End Process File" block 319 in which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    detecting a file attachment associated with an electronic mail message (email);
    generating a regular expression based on a name associated with the file attachment in response to the detecting;
    generating a list of alternative file names based upon the regular expression, wherein each listed file name corresponds to a different alternative file of a plurality of possible alternative files;
    sorting the list of alternative file names according to a sort parameter to produce a sorted list;
    displaying the sorted list in a graphical user interface (GUI); and
    replacing the file attachment with an alternative file attachment corresponding to one of the different alternative files selected from the displayed sorted list displayed in the GUI.

2. The method of claim 1, further comprising transmitting to a receiving party the alternative file attachment in conjunction with the email in response to the replacing of the file attachment.

3. The method of claim further comprising:
    not replacing the file attachment in response to an indication of no selection from the displayed sorted list displayed in the GUI; and
    transmitting the file attachment in conjunction with the email to a receiving party.

4. The method of claim 1, wherein the sort parameter is based upon a modification date and time associated with the attached file and each file of the plurality possible alternative files.

5. The method of claim 1, wherein the sort parameter is based upon a version number associated with the attached file and each file of the plurality possible alternative files.

6. The method of claim 1, wherein the regular expression is generated based upon the name of the file attachment.

7. The method of claim 1, wherein the regular expression conforms to conventions of directory names and file extensions of a platform on which the application executes.

8. A system, comprising:
    a processor;
    a computer readable storage medium coupled to the processor; and
    logic, stored on the computer readable storage medium and executed on the processor, for:
        detecting a file attachment associated with an electronic mail message (email);
        generating a regular expression based on a name associated with the file attachment in response to the detecting;
        generating a list of alternative file names based upon the regular expression, wherein each listed file name corresponds to a different alternative file of as plurality of possible alternative files;
        sorting the list of alternative file names according to a sort parameter to produce a sorted list;
        displaying the sorted list in a graphical user interface (GUI); and
        replacing the file attachment with an alternative file attachment corresponding to one of the different alternative files selected from the displayed sorted list displayed in the GUI.

9. The system of claim 8, the logic further comprising logic for transmitting to a receiving party the alternative file attachment in conjunction with the email in response to the replacing of the file attachment.

10. The system of claim 8, the logic further comprising logic for:
    transmitting the file attachment in conjunction with the email to a receiving party;
    wherein the file attachment is not replaced in response to an indication of no selection from the displayed sorted list displayed in the GUI.

11. The system of claim 8, wherein the sort parameter is based upon a modification date and time associated with the attached file and each file of the plurality possible alternative files.

12. The system of claim 8, wherein the sort parameter is based upon a version number associated with the attached file and each file of the plurality possible alternative files.

13. The system of claim 8, wherein the regular expression is generated based upon the name of the file attachment.

14. The system of claim 8, wherein the regular expression conforms to conventions of directory names and file extensions of a platform on which the application executes.

15. A computer programming product, comprising:
    a non-transitory computer readable storage medium; and
    logic, stored on the computer readable storage medium for execution on a processor, for:
        detecting a file attachment associated with an electronic mail message (email);
        generating a regular expression based on a name associated with the file attachment in response to the detecting;
        generating a list of alternative file names based upon the regular expression, wherein each listed file name corresponds to a different alternative file of a plurality of possible alternative files;
        sorting the list of alternative file names according to a sort parameter to produce a sorted list;
        displaying the sorted list in a graphical user interface (GUI); and
        replacing the file attachment with an alternative file attachment corresponding to one of the different alternative files selected from the displayed sorted list displayed in the GUI.

16. The computer programming product of claim 15, the logic further comprising logic for transmitting to a receiving party the alternative file in conjunction with the email in response to the replacing of the file attachment.

17. The computer programming product of claim 15, the logic further comprising logic for:
    transmitting the file attachment in conjunction with the email to a receiving party;
    wherein the file attachment is not replaced in response to an indication of no selection from the displayed sorted list displayed in the GUI.

18. The computer programming product of claim 15, wherein the sort parameter is based upon a modification date and time associated with the attached file and each file of the plurality possible alternative files.

19. The computer programming product of claim 15, wherein the sort parameter is based upon a version number associated with the attached file and each file of the plurality possible alternative files.

20. The computer programming product of claim 15, wherein the regular expression is generated based upon the name of the file attachment.

21. The method of claim 1, the generating the regular expression comprising processing the name associated with the file attachment with spell checking logic.

22. The system of claim 8, wherein the regular expression represents possible names, generated by spell checking logic, associated with the attachment.

23. The computer programming product of claim 15, wherein the regular expression represents names, generated by spell checking logic, associated with the file attachment.

* * * * *